(12) United States Patent
Hanafusa

(10) Patent No.: US 7,789,173 B2
(45) Date of Patent: Sep. 7, 2010

(54) HYDRAULICALLY DRIVEN VEHICLE

(75) Inventor: Jitsumi Hanafusa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 684 days.

(21) Appl. No.: 11/731,544

(22) Filed: Mar. 30, 2007

(65) Prior Publication Data
US 2007/0235232 A1 Oct. 11, 2007

(30) Foreign Application Priority Data
Apr. 7, 2006 (JP) .............................. 2006-106515

(51) Int. Cl.
*B62D 11/24* (2006.01)
(52) U.S. Cl. ..................... 180/6.32; 180/6.48
(58) Field of Classification Search ................ 180/6.32, 180/6.4, 6.48, 6.2, 315; 74/473.3
See application file for complete search history.

(56) References Cited

U.S. PATENT DOCUMENTS

| | | | | |
|---|---|---|---|---|
| 5,094,326 A | * | 3/1992 | Schemelin et al. | 192/3.63 |
| 5,247,784 A | * | 9/1993 | Kitamura et al. | 56/10.8 |
| 5,927,151 A | * | 7/1999 | Alber et al. | 74/473.3 |
| 6,067,872 A | * | 5/2000 | Miyahara et al. | 74/473.3 |
| 6,523,635 B1 | * | 2/2003 | Johnston et al. | 180/307 |
| 6,581,704 B2 | * | 6/2003 | Law et al. | 180/6.32 |
| 6,904,985 B2 | * | 6/2005 | Ferree et al. | 180/6.32 |
| 7,407,023 B2 | * | 8/2008 | Sueshige et al. | 180/6.34 |
| 7,434,637 B2 | * | 10/2008 | Sueshige | 180/6.32 |
| 7,467,677 B2 | * | 12/2008 | Barrier | 180/6.48 |
| 7,478,689 B1 | * | 1/2009 | Sugden et al. | 180/19.3 |
| 2006/0042840 A1 | * | 3/2006 | Goto et al. | 180/6.32 |
| 2009/0250270 A1 | * | 10/2009 | Hauser | 180/6.32 |

FOREIGN PATENT DOCUMENTS

| | | |
|---|---|---|
| EP | 0 869 048 A2 | 10/1998 |
| JP | 07-309149 | 11/1995 |

* cited by examiner

*Primary Examiner*—Tony H. Winner
(74) *Attorney, Agent, or Firm*—Carrier, Blackman & Associates P.C.; Joseph P. Carrier; William D. Blackman

(57) ABSTRACT

A hydraulically driven vehicle is disclosed which is moved or turned by driving left and right hydraulic transmissions with one engine and driving left and right drive wheels with these hydraulic transmissions. The vehicle includes a gear-shifting mechanism for converting the actions of an operator and transmitting the result to the hydraulic transmissions, which mechanism is comprised of a first swinging member that is swung by a vehicle speed cable, and left and right second swinging members that are placed on the first swinging member, that are swung by left and right steering cables, and that push and pull push-pull rods.

9 Claims, 14 Drawing Sheets

US 7,789,173 B2

HYDRAULICALLY DRIVEN VEHICLE

FIELD OF THE INVENTION

The present invention relates to a hydraulically driven vehicle wherein left and right hydrostatic transmissions are driven by an engine, and left and right drive wheels are driven by these left and right hydrostatic transmissions.

BACKGROUND OF THE INVENTION

A hydrostatic transmission is equipped with a variable capacity swash-plate hydraulic pump and a hydraulic motor. When a swash-plate hydraulic pump is driven by an engine, the pump produces high-pressure operating oil. When this high-pressure operating oil is supplied to the hydraulic motor, the hydraulic motor rotates. The drive wheels can be turned by the hydraulic motor.

The engine operates continuously at a constant speed. The rotational speed of the input shaft of the swash-plate hydraulic pump is constant, but the amount of operating oil ejected can be changed by varying the angle of inclination of the swash-plate from the exterior. The hydraulic motor can be rotated normally, stopped, and reversed by varying the angle of inclination of the swash plate. The rotational speed of the output shaft of the hydraulic motor can be varied by adjusting the angle of inclination of the swash plate while the motor is rotated normally or reversed.

Using a hydrostatic transmission makes it possible to maintain a preferred rotational speed in the engine, to control the speed of the vehicle, to move the vehicle forward, to stop the vehicle, or to move the vehicle in reverse.

If an engine is designed to drive left and right hydrostatic transmissions, wherein a left drive wheel is driven by the left hydrostatic transmission and a right drive wheel is driven by the right hydrostatic transmission, a difference in speed can be created between the left and right drive wheels simply by creating a difference in the swash-plate angles of inclination between the left and right hydrostatic transmissions. As a result, the vehicle can be arbitrarily turned to the left or to the right without steering the vehicle.

Japanese Patent Laid-Open Publication No. 7-309149 (JP 7-309149 A), for example, discloses a hydraulically driven vehicle wherein left and right hydrostatic transmissions are driven by one engine. This hydraulically driven vehicle is described with reference to FIGS. 11 through 13 hereof.

As shown in FIG. 11, an engine 102 is mounted in a vehicle frame 101, a left hydrostatic transmission 103L is connected to the engine 102, a left drive wheel 104L is driven by the left hydrostatic transmission 103L, a right hydrostatic transmission 103R is also connected to the engine 102, and a right drive wheel 104R is driven by the right hydrostatic transmission 103R.

Next, the gear-shifting operation will be described.

When a shift lever 105 disposed in proximity to the right drive wheel 104R is operated, a left push-pull rod 106L and a right push-pull rod 106R move together to the left or right of the drawing. Shift arms 107L, 107R protruding from the hydrostatic transmissions 103L, 103R are thereupon swung simultaneously, and the rotational speeds and rotational directions of the left and right drive wheels 104L, 104R are controlled. Specifically, merely operating the shift lever 105 allows the vehicle to be varied between moving forwards and backwards, and the vehicle speed to be varied among stopping, low speeds, and high speeds.

Next, the turning operation will be described.

When a steering wheel 111 is turned, either a left wire 112L or a right wire 112R is pulled taut, while the other is slackened. These actions are converted by a box-shaped transmission 113 to create a difference between the amount of movement in the left push-pull rod 106L and the amount of movement in the right push-pull rod 106R. As a result, a difference in speed is created between the left drive wheel 104L and the right drive wheel 104R, and the vehicle turns to the right or the left.

The detailed structure of the transmission 113 will now be described with reference to FIGS. 12 and 13.

A rotating shaft 115 extending towards the front and back of the drawing spans across a base member 114 that is lowered from the vehicle frame 101, as shown in FIG. 12. The rotating shaft 115 is mechanically connected to the shift lever 105 via a sub-lever 116, a rod 117, and a sub-lever 118 extending from the shift lever 105. Therefore, the rotating shaft 115 is rotated by the movement of the shift lever 105. A pipe 119 extends upward from the rotating shaft 115, and a mixing lever 122 is provided at the top of the pipe 119 via a pin 121.

A gate-shaped guide member 125 is attached to a pair of pivoting shafts 124, 124 extending from the base member 114, with the guide member capable of swinging to the front and back of the drawing. A large groove 126 is formed in the top surface of the guide member 125, and the top of the mixing lever 122 is inserted into this groove 126. The groove 126 is shaped along an arc centered on the rotating shaft 115, and the mixing lever 122 does not come out of the groove even when the mixing lever 122 swings along with the rotation of the rotating shaft 115.

The guide member 125 swings around the pivoting shafts 124 and comes into proximity of either the left push-pull rod 106L or the right push-pull rod 106R, as shown in FIG. 13. A detailed description is not given here, but when the guide member 125 comes into proximity of the left push-pull rod 106L or the right push-pull rod 106R, a difference is created between the amount of movement in the left push-pull rod 106L and the amount of movement in the right push-pull rod 106R.

The transmission 113 described above has a complicated and bulky structure due to being composed of the pivoting shafts 124, 124, the guide member 125, the rotating shaft 115, the mixing lever 122, and other components. Mounting a complicated and large transmission 113 in a small vehicle makes the vehicle more expensive and larger.

In view of this, there is a demand to make the transmission smaller and simpler.

SUMMARY OF THE INVENTION

According to the present invention, there is provided a hydraulically driven vehicle comprising: an engine mounted on a vehicle frame; a left hydrostatic transmission that is driven by the engine and that drives a left drive wheel; a right hydrostatic transmission that is driven by the engine and that drives a right drive wheel; and a gear-shifting mechanism for transmitting to the hydrostatic transmissions the movement of a speed setting device that is operated by an operator to adjust the traveling speed of the vehicle frame, and the movement of left and right steering devices that are operated by the operator to turn the vehicle frame, the gear-shifting mechanism comprising: a first swinging member that is swingably attached to the vehicle frame with left and right first pins and that is moved by the speed setting device; a left second swinging member that is swingably attached to the first swinging member at a position away from the left and right first pins and that is moved by the left steering device connected at one end; a left resilient member that urges the left second swinging member into the first swinging member so that the left second swinging member swings together with the first swinging member when the left steering device is not operating; a right second swinging member that is rotatably attached to the first swinging member at a position away from the left and right first pins and is moved by the right steering device connected to one end; a right resilient member that urges the right second swinging member into the first swinging member so that the right second swinging member swings together with the first swinging member when the right steering device is not operating; a left drive plate swingably attached to the vehicle frame to control the left hydrostatic transmission; a left link plate that connects the left drive plate to the other end of the left second swinging member; a right drive plate swingably attached to the vehicle frame to control the right hydrostatic transmission; and a right link plate that connects the right drive plate to the other end of the right second swinging member, wherein the speed setting device is operated to incline the first swinging member and to simultaneously incline the left and right drive plates, so that a high forward speed, a low forward speed, stopping, a low reverse speed, and a high reverse speed can be arbitrarily set, and the left steering device can be operated to return the left drive plate to the stopped position, and the right steering device can be operated to return the right drive plate to the stopped position when the first swinging member is inclined.

The gear-shifting mechanism is composed of a first swinging member, left and right second swinging members, left and right drive plates, and left and right link plates, and the configuration thereof is simple. As a result, it is easy to reduce the size and cost of the gear-shifting mechanism.

Preferably, the second left swinging member is connected by a second left pin to one end of the first swinging member, the second right swinging member is connected by a second right pin to one end of the first swinging member, and the position of the second left pin is set in the second left swing member while the position of the second right pin is set in the second right swinging member so that the axial center of the second left pin or the axial center of the second right pin is superposed over the axial center of the first pin when the swinging members are operated by the steering devices.

BRIEF DESCRIPTION OF THE DRAWINGS

A preferred embodiment of the present invention will be described in detail below, by way of example only, with reference to the accompanying drawings, in which.

DESCRIPTION OF THE PREFERRED EMBODIMENT

In the following descriptions, the directions left and right are determined based on the manner in which the operator holds operating handles 24. The directions front and back are determined similarly.

Figure 1:
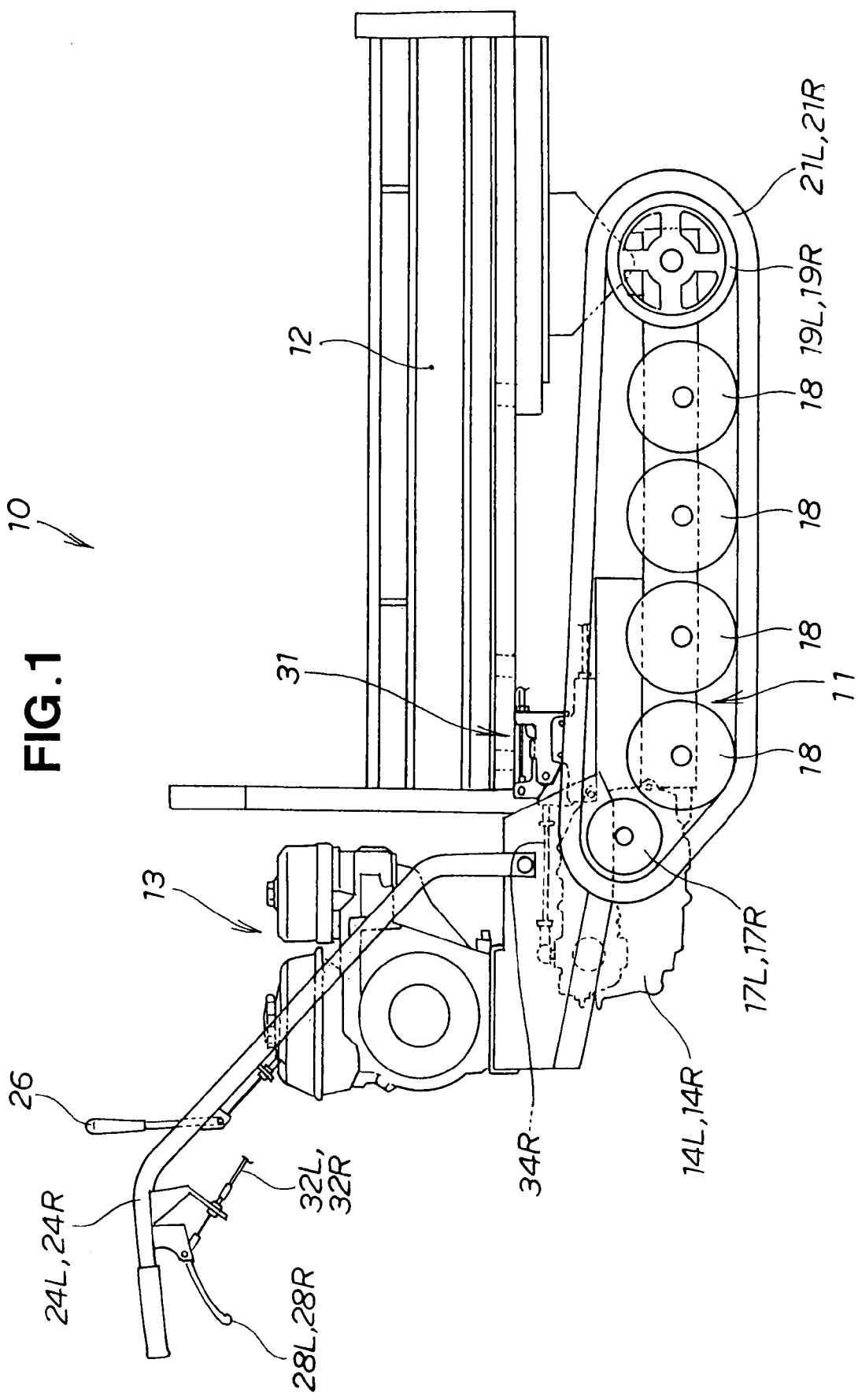
FIG. 1 is a side view of the hydraulically driven vehicle according to the present invention.

As shown in FIG. 1, a hydraulically driven vehicle 10 is composed of a vehicle frame 11; a loading platform 12 and an engine 13 as a drive source, both mounted on the vehicle frame 11; a left hydrostatic transmission 14L and a right hydrostatic transmission 14R (14L is behind 14R; the relationship between L and R is the same hereinbelow as in this drawing) that are disposed below the engine 13 and are driven by the drive force of the engine 13; a left drive wheel 17L and a right drive wheel 17R attached to the output-side shafts of the hydrostatic transmissions 14L, 14R; turning wheels 18 that are attached to the vehicle frame 11; driven wheels 19L, 19R provided at the front of the vehicle frame 11; crawlers 21L, 21R that are wound around the drive wheels, the turning wheels, and the driven wheels; operating handles 24L, 24R that extend upward at a rearward incline from the vehicle frame 11; a speed setting device 26 and left and right steering devices 28L, 28R provided to these operating handles 24L, 24R; and a gear-shifting mechanism 31 disposed between the speed setting device 26 and steering devices 28L, 28R and the hydrostatic transmissions 14L, 14R.

The speed setting device 26 is an operating member for controlling the forward movement, stopping, and reverse movement of the vehicle in addition to speed, and is preferably embodied as a lever, for example.

Figure 2:
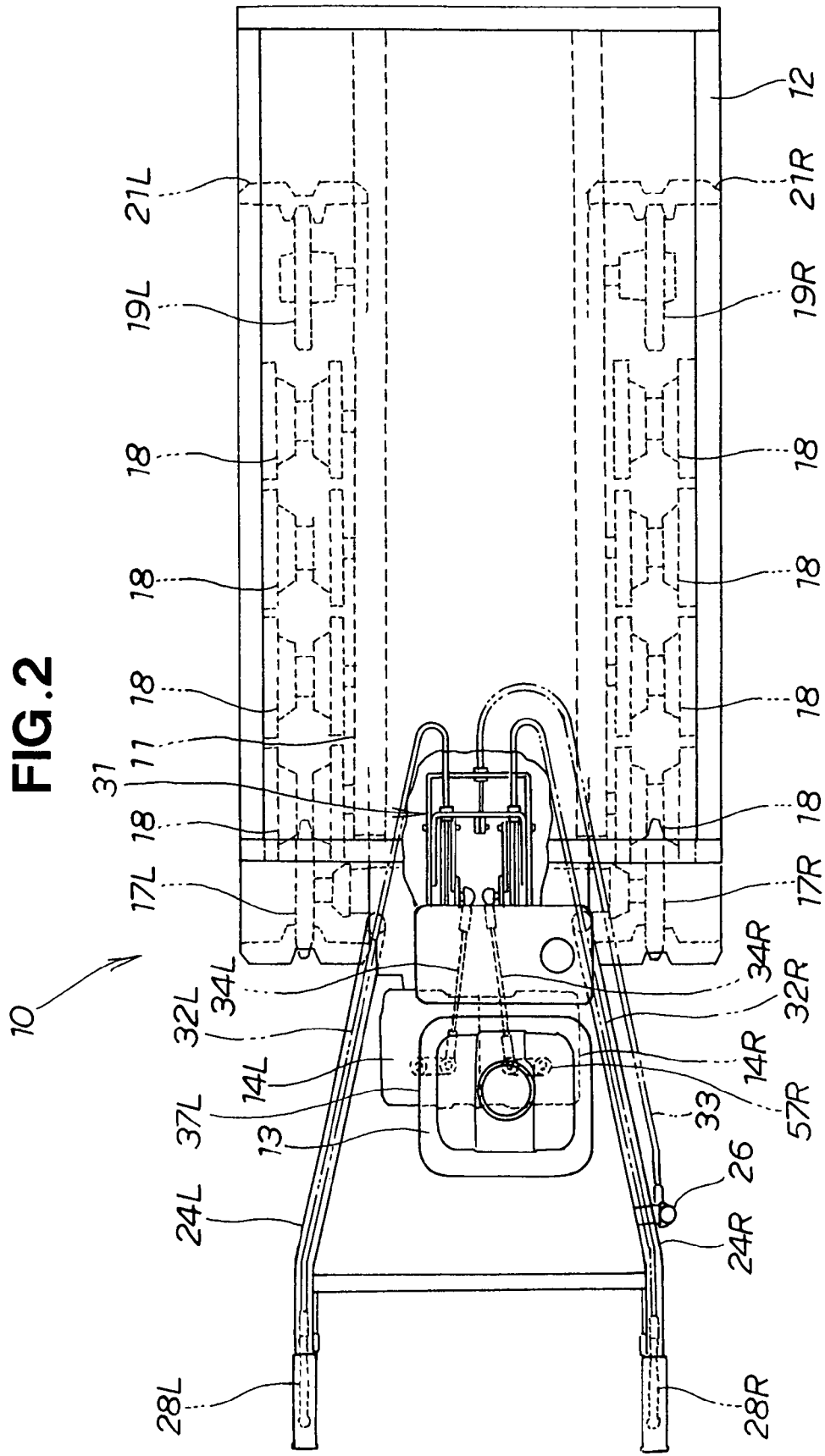
FIG. 2 is a plan view of the hydraulically driven vehicle.

The left and right hydrostatic transmissions 14L, 14R are disposed at the rear of the vehicle frame 11; and the gear-shifting mechanism 31 is disposed at the front of the vehicle frame 11, as shown in FIG. 2. The steering devices 28L, 28R are provided respectively to the left and right operating handles 24L, 24R extending backward from the vehicle frame 11, and the speed setting device 26 is provided on the right operating handle 24R.

The left steering device 28L and the gear-shifting mechanism 31 are connected by the a left steering cable 32L; the right steering device 28R and the gear-shifting mechanism 31 are connected by a right steering cable 32R; and the speed setting device 26 and gear-shifting mechanism 31 are connected by a vehicle speed cable 33.

Push-pull rods 34L, 34R are connected between the gear-shifting mechanism 31 and the left and right hydrostatic transmissions 14L, 14R. These push-pull rods 34L, 34R fulfill the role of transmitting the movement of the gear-shifting mechanism 31 to the left and right hydrostatic transmissions 14L, 14R.

The structural elements of the gear-shifting mechanism 31 will now be described with reference to FIG. 3.

Figure 3:
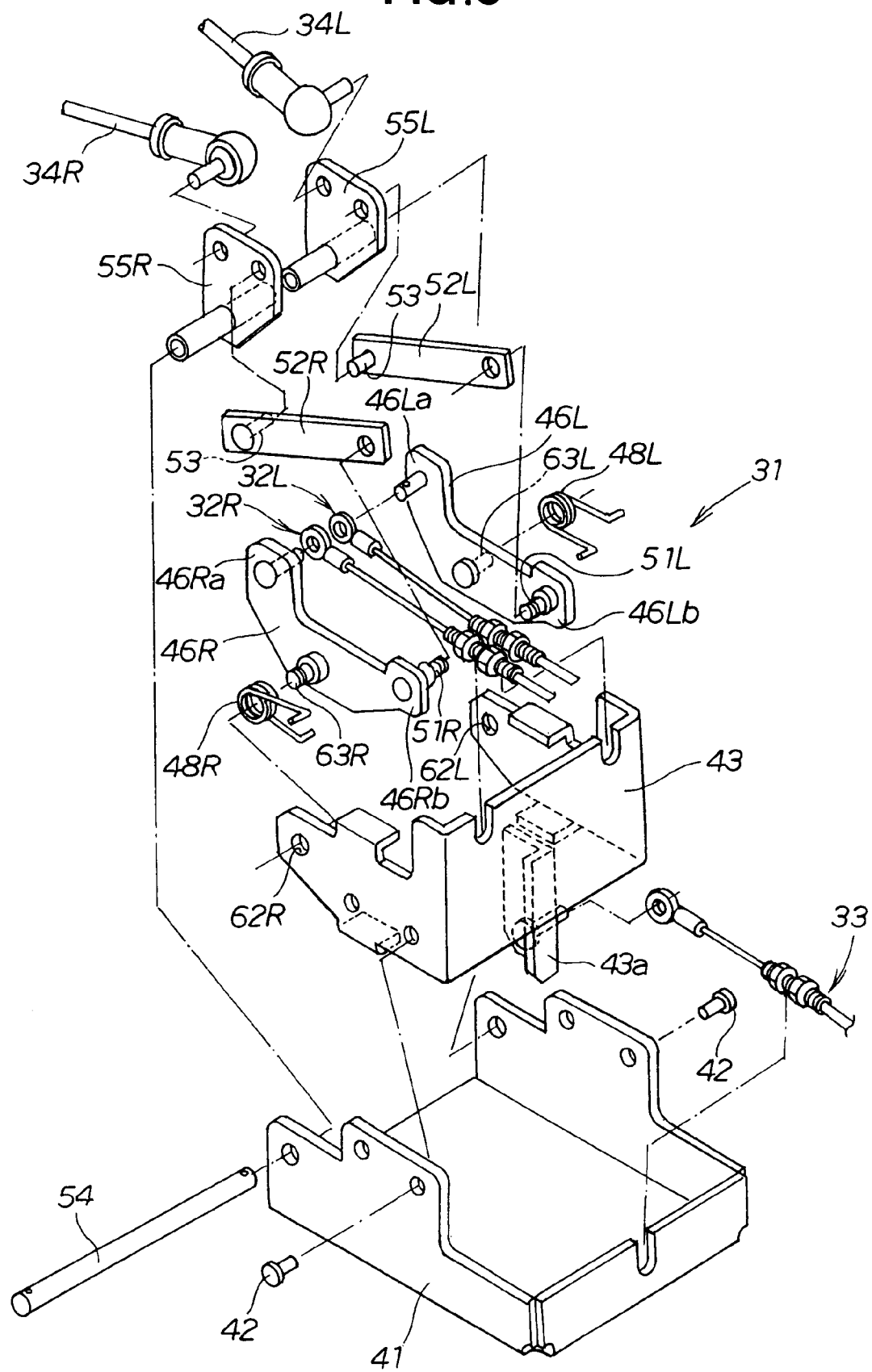
FIG. 3 is an exploded view of a gear-shifting mechanism mounted in the hydraulically driven vehicle.

A first swinging member 43 is attached with first pins 42, 42 to a base bracket 41 attached to the vehicle frame 11 (FIG. 2), as shown in FIG. 3. The vehicle speed cable 33 is connected to an end 43a of the first swinging member 43, and the vehicle speed cable 33 is operated by the speed setting device 26 (FIG. 2), allowing the first swinging member to swing around the first pins 42, 42.

A seesaw-shaped second left swinging member 46L and second right swinging member 46R are attached to the first swinging member 43 at positions separated from the first pins 42, 42. Specifically, a center pin 63L of the second left swinging member 46L is inserted into a hole 62L formed in the distal end of the first swinging member 43, and a center pin 63R of the second right swinging member 46R is inserted into a hole 62R formed in the distal end of the first swinging member 43.

A left resilient member 48L that exhibits a recoil or biasing action, such as a torsion spring, is attached to the left pin 63L; and a right resilient member 48R that exhibits a recoil or biasing action, such as a torsion spring, is attached to the right pin 63R.

The left steering cable 32L is connected to one end 46La of the second left swinging member 46L, and the right steering cable 32R is connected to one end 46Ra of the second right swinging member 46R.

A second left pin 51L is provided to the other end 46Lb of the seesaw-shaped second left swinging member 46L, and one end of a left link plate 52L is connected to the second left pin 51L.

A second right pin 51R is provided to the other end 46Rb of the seesaw-shaped second right swinging member 46R, and one end of a right link plate 52R is connected to the second right pin 51R.

A pair of left and right drive plates 55L, 55R is attached by a shaft member 54 to the base plate 41 so as to be capable of swinging independently of each other.

The other end of the left link plate 52L and the left push-pull rod 34L are connected to the left drive plate 55L. The left drive plate 55L is driven by the left link plate 52L and fulfills the role of pushing and pulling the left push-pull rod 34L.

The other end of the right link plate 52R and the right push-pull rod 34R are connected to the right drive plate 55R. The right drive plate 55R is driven by the right link plate 52R and fulfills the role of pushing and pulling the right push-pull rod 34R.

Figure 4:
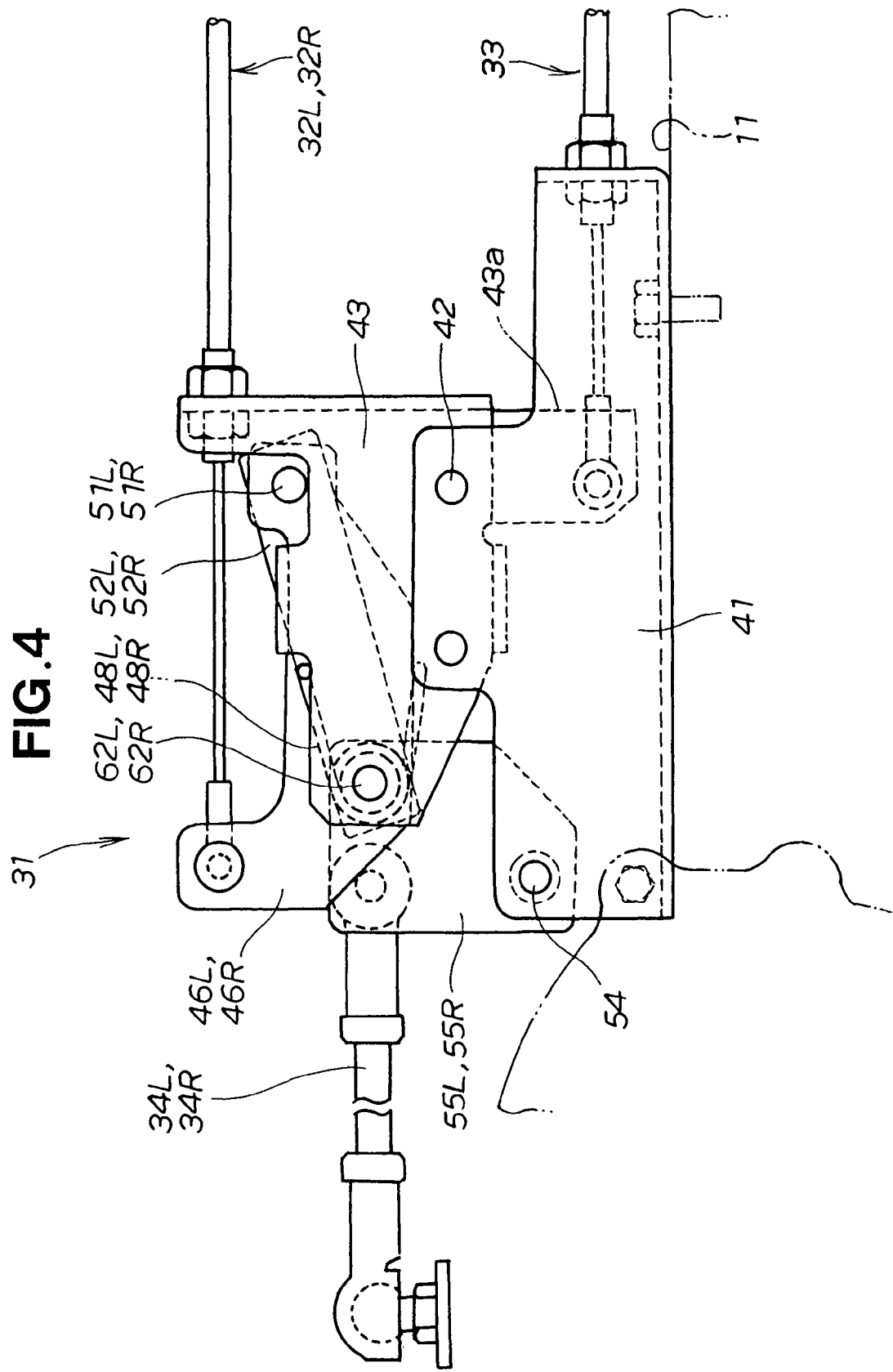
FIG. 4 is a side view of the gear-shifting mechanism.

In the gear-shifting mechanism 31, the base bracket 41 is fixed by a bolt to the vehicle frame 11 as shown in FIG. 4, which is a side view. Therefore, the first swinging member 43 is swingably attached to the vehicle frame 11 by the first pins 42. The gear-shifting mechanism 31 is sufficiently small in height, as can be clearly seen from FIG. 4.

Figure 5:
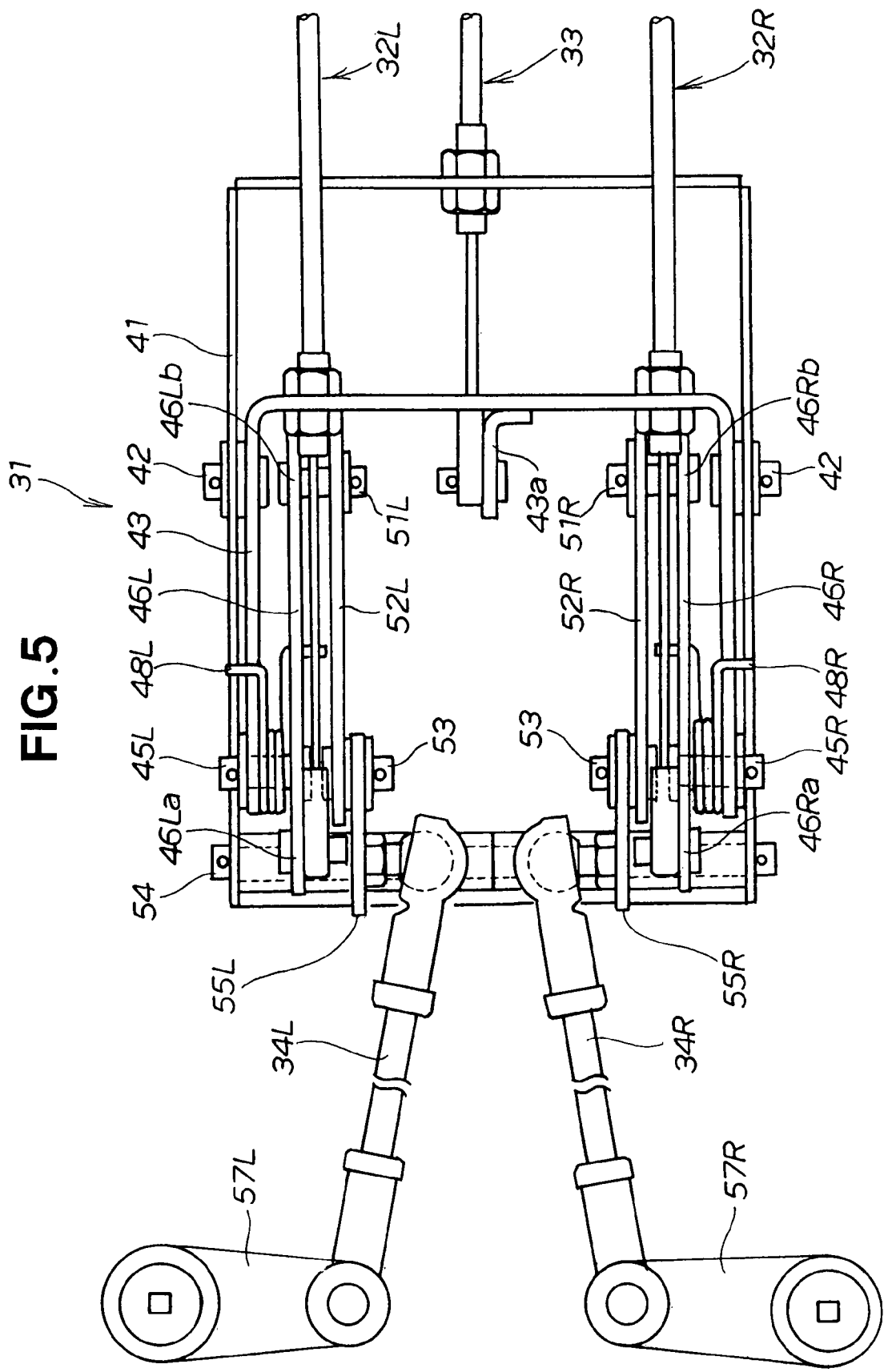
FIG. 5 is a plan view of the gear-shifting mechanism.

In the gear-shifting mechanism 31, the left push-pull rod 34L is connected to a gear-shifting arm 57L appended to the left hydrostatic transmission 14L (FIG. 2), and the right push-pull rod 34R is connected to a gear-shifting arm 57R appended to the right hydrostatic transmission 14R (FIG. 2), as shown in FIG. 5, which is a plan view. The gear-shifting mechanism 31 is sufficiently compact, as can be clearly seen from FIG. 5.

The following is a description of the action of the gear-shifting mechanism 31 described above.

First, the correlation between the speed setting device 26 and the gear-shifting mechanism 31 will be described with reference to FIGS. 6A through 6D.

Figure 6A:
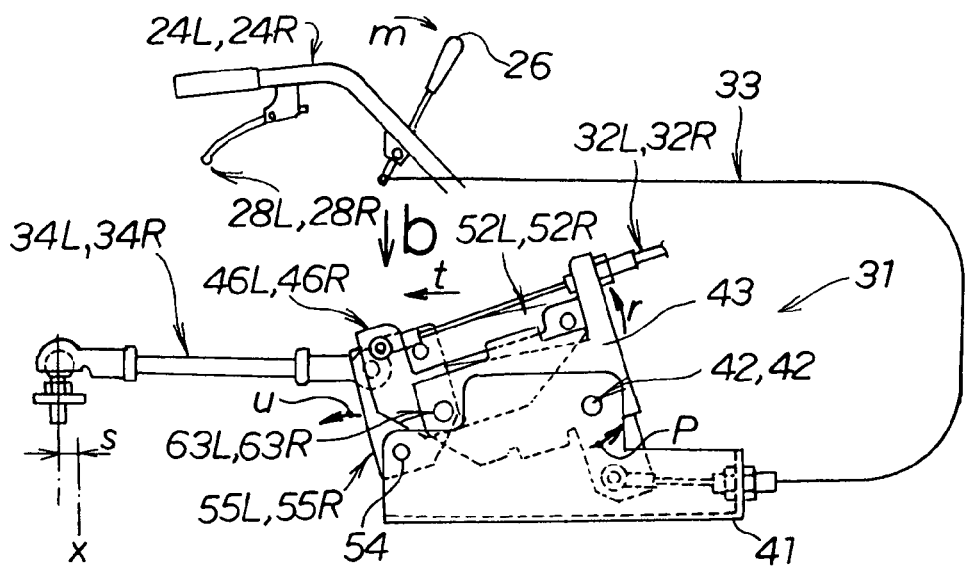
FIGS. 6A through 6D are views showing the correlation between a speed setting device and the gear-shifting mechanism.

In FIG. 6A, the speed setting device 26 is operated in the direction of the arrow m and is caused to pull on the vehicle speed cable 33, whereupon the first swinging member 43 swings. around the first pins 42, 42 in the direction of the arrow p, and the left and right second swinging members 46L, 46R swing together with the swinging of the first swinging member 43 as the first swinging member 43 swings in the direction of the arrow r. The link plates 52L, 52R then move in the direction of the arrow t along with the swinging of the left and right second swinging members 46L, 46R. The drive plates 55L, 55R are driven by the link plates 52L, 52R in the direction of the arrow u around a shaft member 54 of the base bracket 41, and the left and right push-pull rods 34L, 34R are moved by a stroke s from the stopped position x.

Figure 6B:
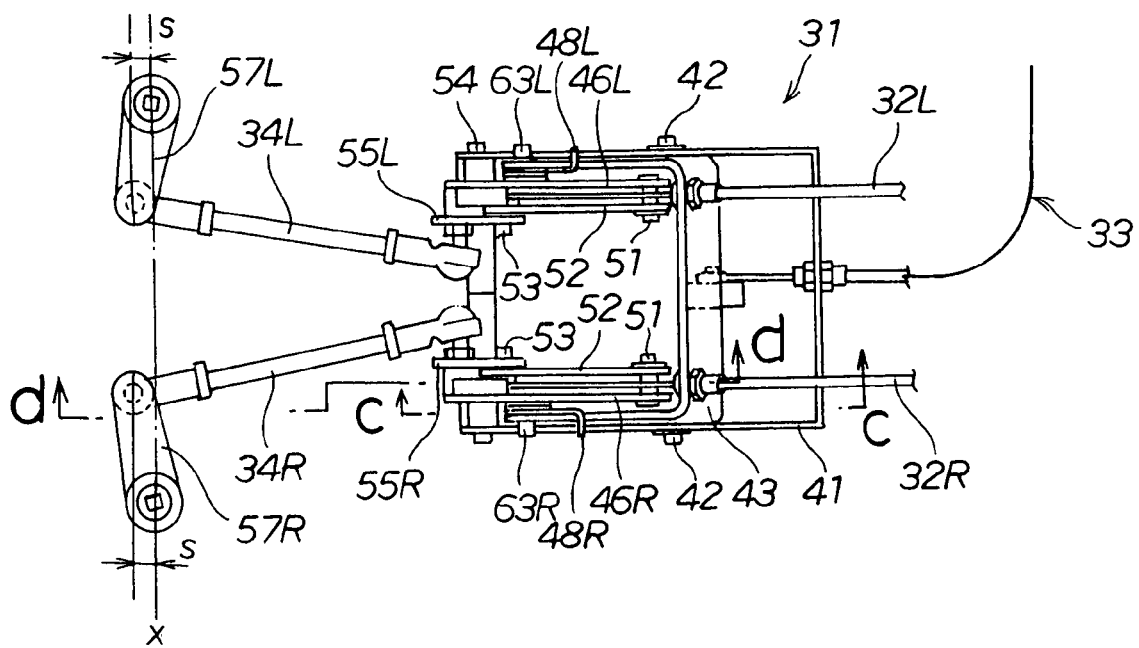

In FIG. 6B, which is a view along the arrow b in FIG. 6A, the left and right push-pull rods 34L, 34R both move by a stroke s. The vehicle moves forward at a high or low speed, or moves in reverse at a high or low speed, in accordance with the size of this stroke s.

Figure 6C:
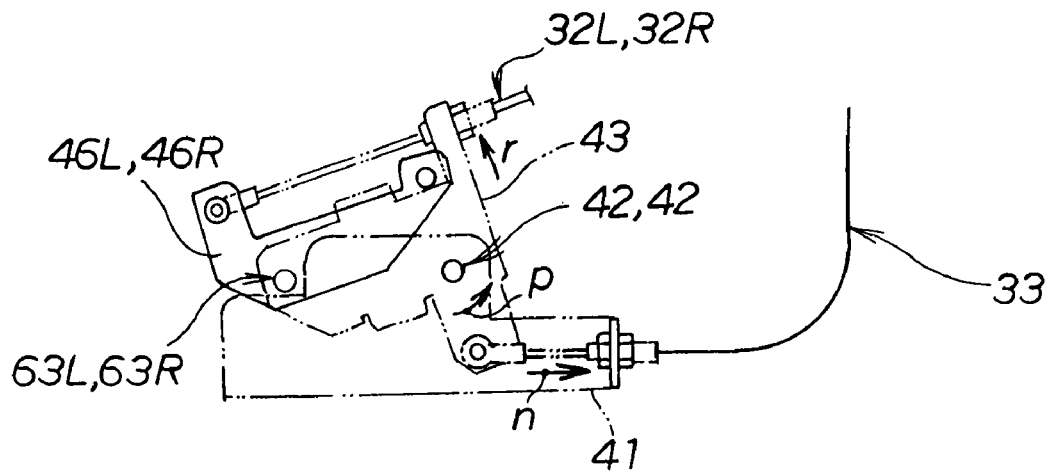

In FIG. 6C, which is a view along the arrow c-c in FIG. 6B, when the vehicle speed cable 33 is pulled in the direction of the arrow n, the first swinging member 43 swings around the first pins 42, 42 in the direction of the arrow p, and the left and right second swinging members 46L, 46R swing together with the first swinging member 43 as the first swinging member 43 swings in the direction of the arrow r.

Figure 6D:
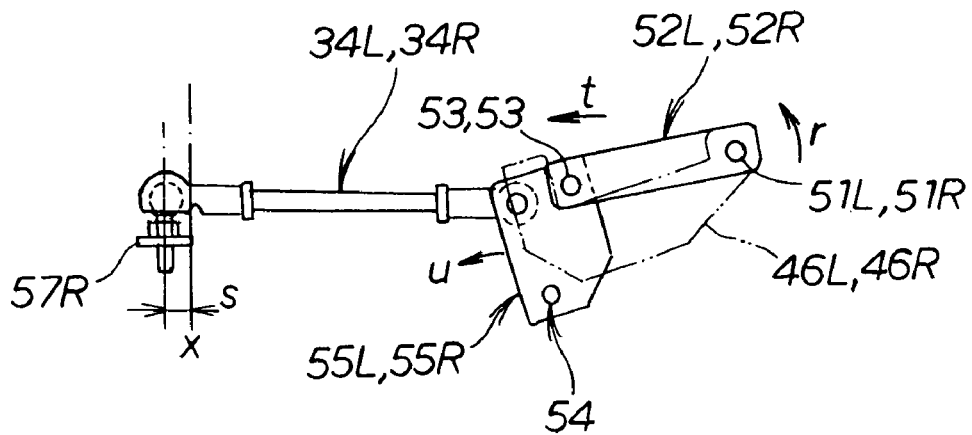

In FIG. 6D, which is a view along the arrow d-d in FIG. 6B, the second swinging members 46L, 46R swing in the direction of the arrow r together with the first swinging member 43. The link plates 52L, 52R are moved in the direction of the arrow t by the second left pin 51L and the second right pin 51R of the second swinging members 46L, 46R. The drive plates 55L, 55R swing relative to the vehicle frame in the direction of the arrow u around the shaft member 54 that is rotatably attached to the base bracket 41, and the stroke s can be added to the push-pull rods 34L, 34R.

As described above, the left and right drive wheels can be driven in the same direction and at the same speed by operating the speed setting device 26.

Next, the correlation between the steering device 28R and the gear-shifting mechanism 31 will be described with reference to FIGS. 7A through 7D.

Figure 7A:
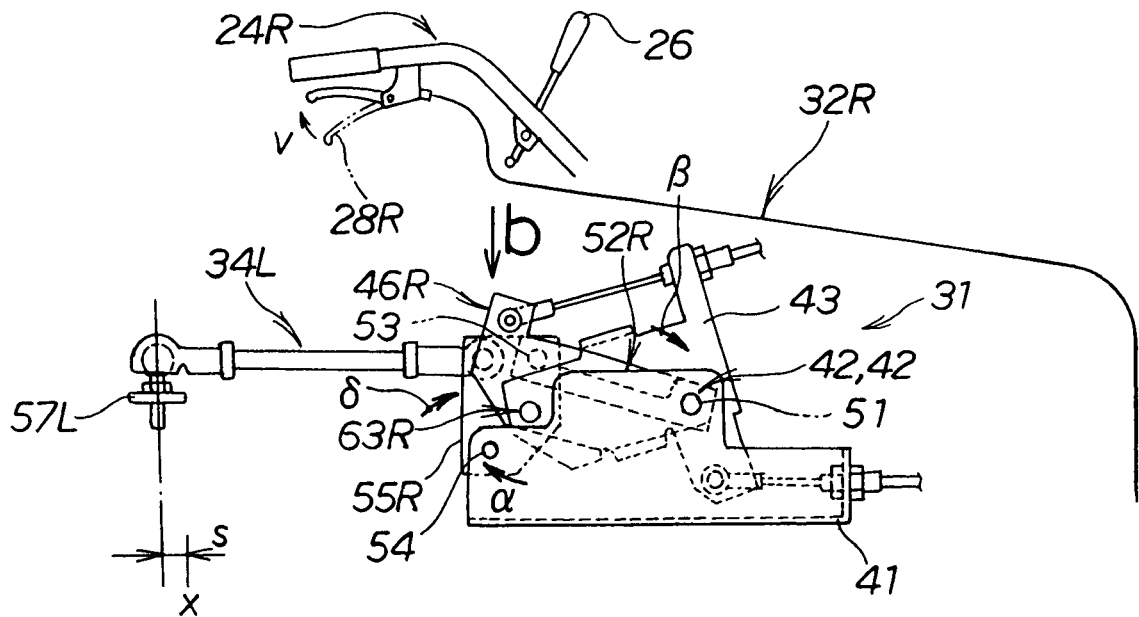
FIGS. 7A through 7D are views showing the correlation between steering devices and the gear-shifting mechanism.

In FIG. 7A, the speed setting device 26 is operated in the same manner as in FIG. 6A. The steering device 28R operates in the direction of the arrow v and pulls the steering cable 32R. The second right swinging member 46R then swings around the pin 63R in the direction of the arrow α, and the link plate 52R moves in the direction of the arrow β along with the swinging of the second right swinging member 46R.

Figure 7B:
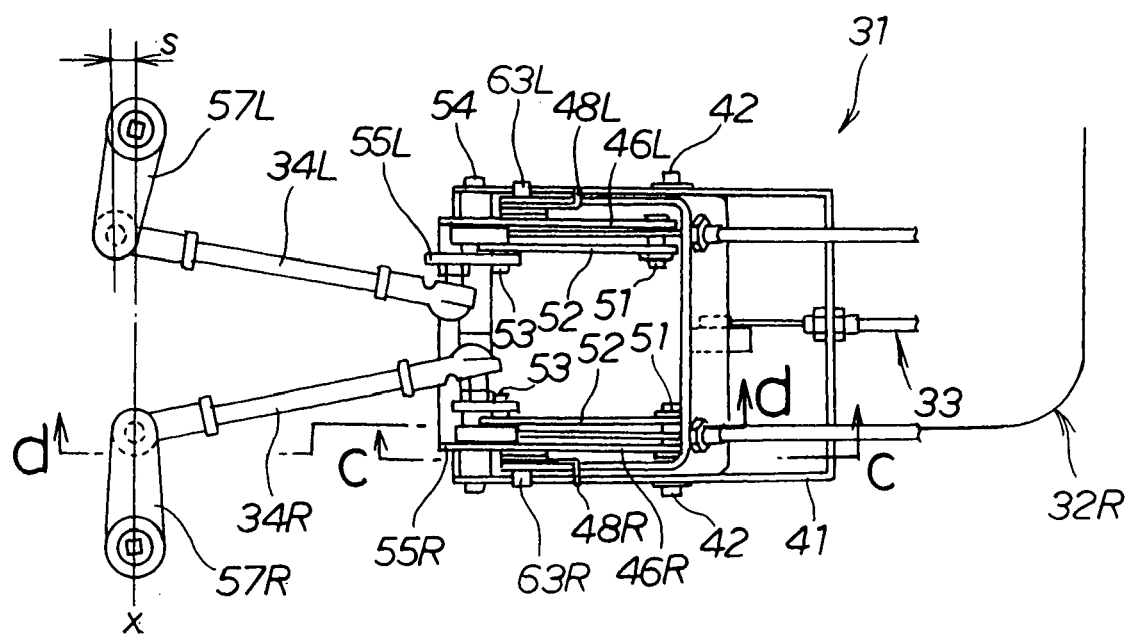
Figure 7C:
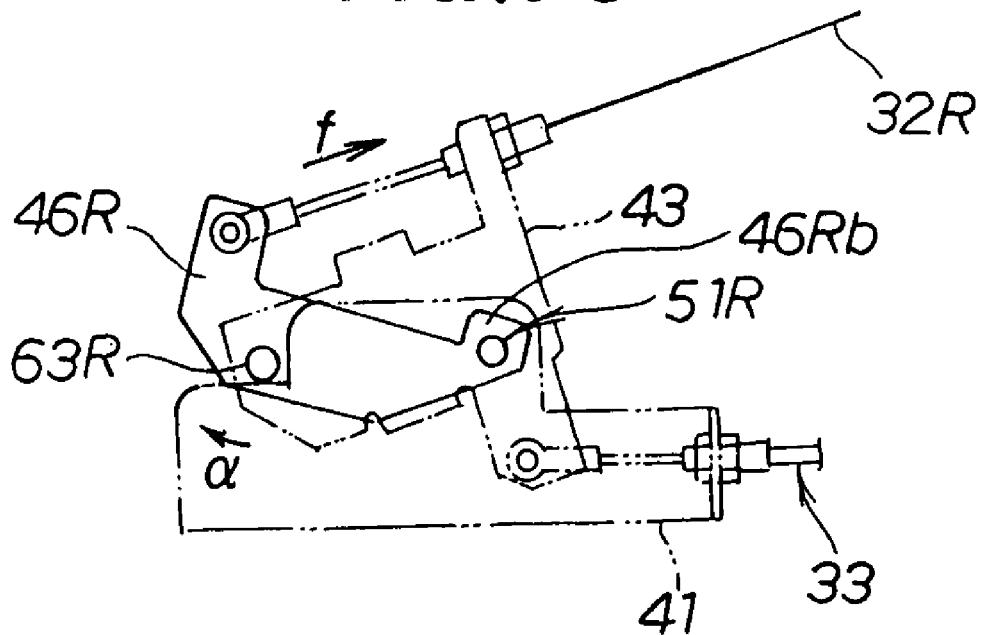
Figure 7D:
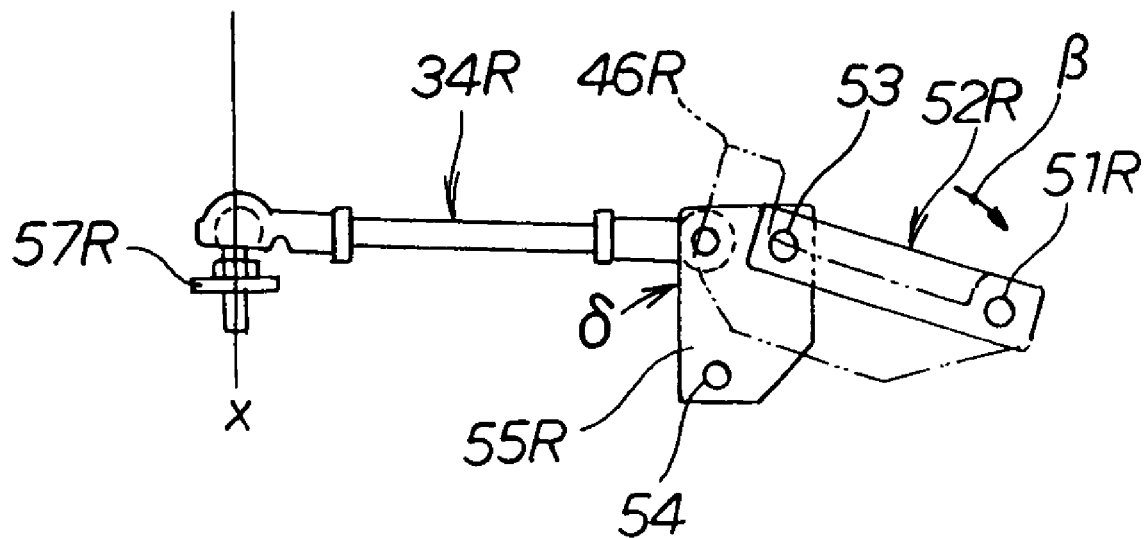

In FIG. 7B, which is a view from the arrow b in FIG. 7A, the right push-pull rod 34R moves to the stopped position x (the details are described in FIG. 7D). As a result, the right gear-shifting arm 57R is rotated, and the speed of the right drive wheel reaches zero. Since the rotational speed of the left drive wheel does not change, the vehicle (FIG. 2) turns to the right.

In FIG. 7C, which is a view along the arrow c-c in FIG. 7B, the second right swinging member 46R swings around the pin 63R in the direction of the arrow α when the right steering cable 32R is pulled in the direction of the arrow f.

The first swinging member 43 is inclined in relation to the base bracket 41. The second right swinging member 46R swings in the direction of the arrow α in relation to the first swinging member 43.

In FIG. 7D, which is a view along the arrow d-d in FIG. 7B, the right drive plate 55R is swung around the shaft member 54 in the direction of the arrow δ by a pin 53 provided to the link plate 52R. As a result, the right push-pull rod 34R returns to the stopped position x. The right drive wheel is thereby stopped.

A case of turning to the right was described above, and the left steering device 28L (FIG. 2) may be operated in a case of turning to the left.

Next, a series of operations pertaining to stopping, moving forward, and turning will be described.

Figure 8A:
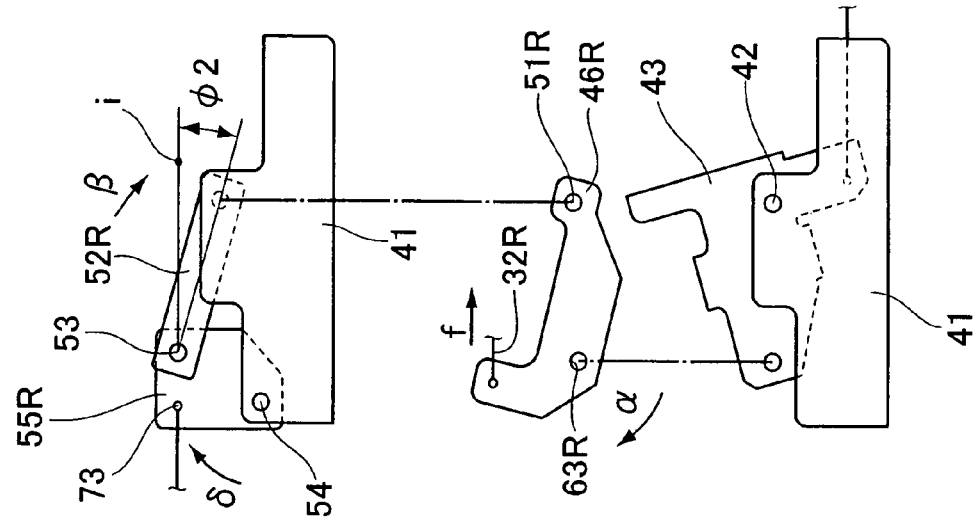
FIG. 8 is a view showing an operation of the gear-shifting mechanism pertaining to forward movement and steering.

The right drive wheel stops when the first swinging member 43 is substantially horizontal, the second right swinging member 46R is also substantially horizontal, the right link plate 52R has rotated counterclockwise by an amount of Ø1 from a horizontal line i, and the right drive plate 55R is in the illustrated position, as shown in FIG. 8A.

Figure 8B:
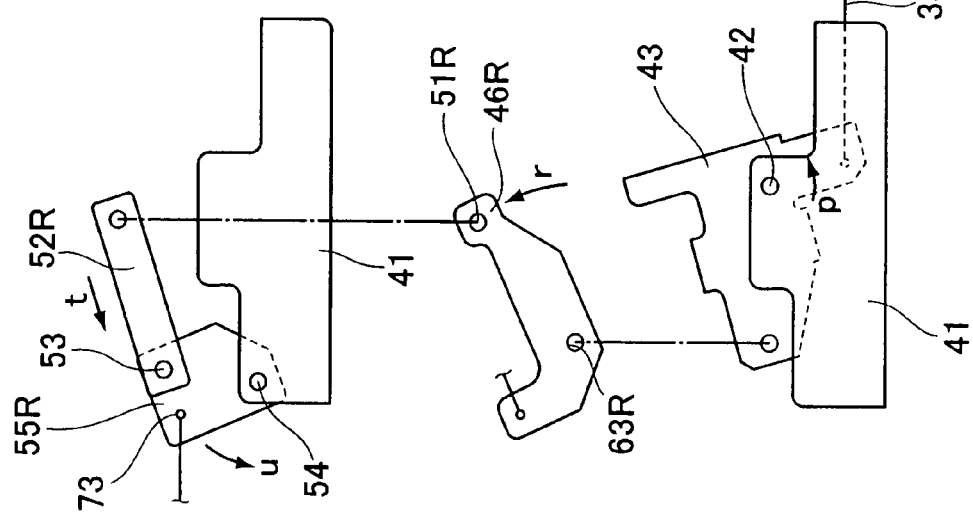

In FIG. 8B, when the vehicle speed cable 33 is pulled, the first swinging member 43 rotates as shown by the arrow p, and the second right swinging member 46R rotates as shown by the arrow r, whereupon the position of the second right pin 51R moves far to the left. Therefore, the right link plate 52R moves as shown by the arrow t, and the drive plate 55R is rotated as shown by the arrow u. As a result, the right drive wheel rotates in the forward direction.

Figure 8C:
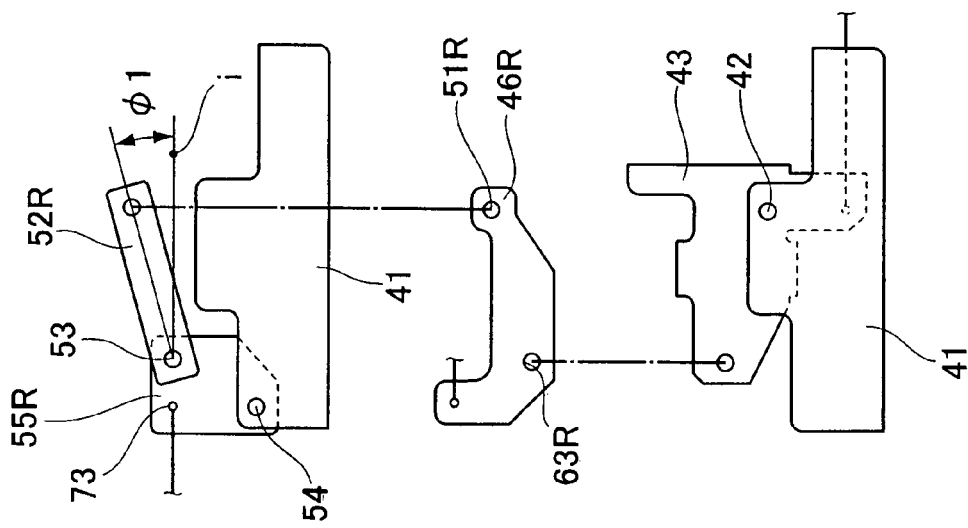

While the vehicle is moving forward, the right steering cable 32R is pulled in the direction of the arrow f, as shown in FIG. 8C. The second right swinging member 46R then rotates as shown by the arrow α. This rotation causes the second right pin 51R to reach substantially the same height as the pin 63R. Specifically, the second right pin 51R moves far to the right. The link plate 52R moves to the right along with this movement, as shown by the arrow β. As a result, the right drive plate 55R rotates as shown by the arrow δ to the same position as the drive plate 55R in FIG. 8A. The right drive wheel then stops, and the vehicle turns to the right because the left drive wheel is still moving forward.

The description of FIG. 8 is supplemented by FIG. 9.

Figure 9A:
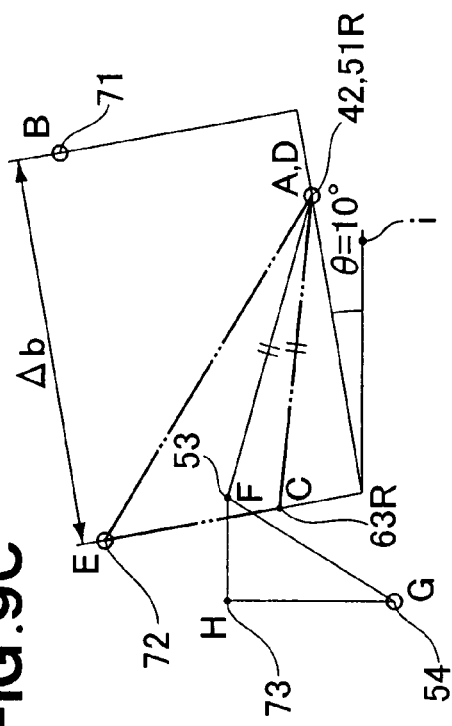
FIG. 9 is a view showing a manner in which the same steering is possible regardless of the speed of the vehicle.

In FIG. 9A, point A indicates the first pins 42 around which the first swinging member 43 swings; point B indicates a lead-in point 71 for the steering cable provided to the first swinging member 43; point C indicates the pin 63R, point D indicates the second right pin 51R of the second swinging members 46L, 46R; point E indicates a tension point 72 of the steering cable; point F indicates the pin 53; point G indicates the shaft member 54; and point H indicates a connecting point 73 of the push-pull rods that provide output.

Specifically, the first swinging member 43 (see FIG. 8) is formed by the lines that connect points C, A, and B in the drawing; the second right swinging member 46R (FIG. 8) is formed by the lines that connect points C, D, and E; the link plate 52R (FIG. 8) is formed by the lines that connect points D and F; and the drive plate 55R (FIG. 8) is formed by the lines that connect points F, G, and H.

Points A and G do not move, and all the other points move. Point H is directly related and moves quickly.

In FIG. 9A, the first swinging member is inclined upward in relation to the horizontal line I by an angle θa of 10°.

Figure 9B:
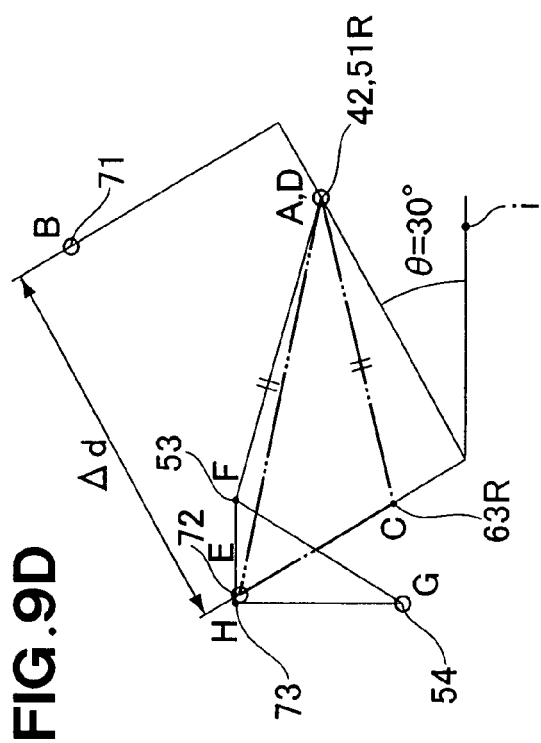

The entire structure is turned to the left using point A and point G as fulcra, resulting in the arrangement shown in FIG. 9B. In FIG. 9B, the angle θc is 30°. Point H is farther to the left than in FIG. 9A, and the vehicle can therefore move forward at a high speed.

The important point herein is that when the steering device 28R (FIG. 2) is not operated, the angles εa and εc around point C are the same. Specifically, the relationship εa=εc is maintained even if the angle θa changes.

The steering devices are operated while the vehicle performs a low-speed movement set in FIG. 9A. When the steering devices are operated, point D moves clockwise around point C.

Figure 9C:
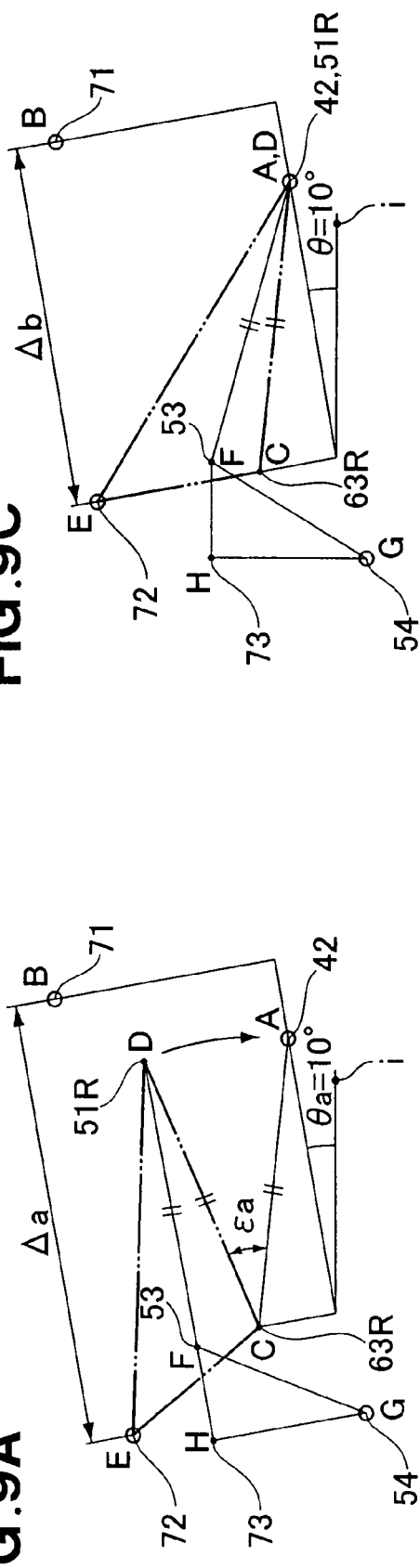

When point D is superposed over point A as shown in FIG. 9C, point H reaches the stopped position.

Similarly, the steering devices are operated while the vehicle performs the high-speed movement set in FIG. 9B. When the steering devices are operated, point D moves clockwise around point C.

Figure 9D:
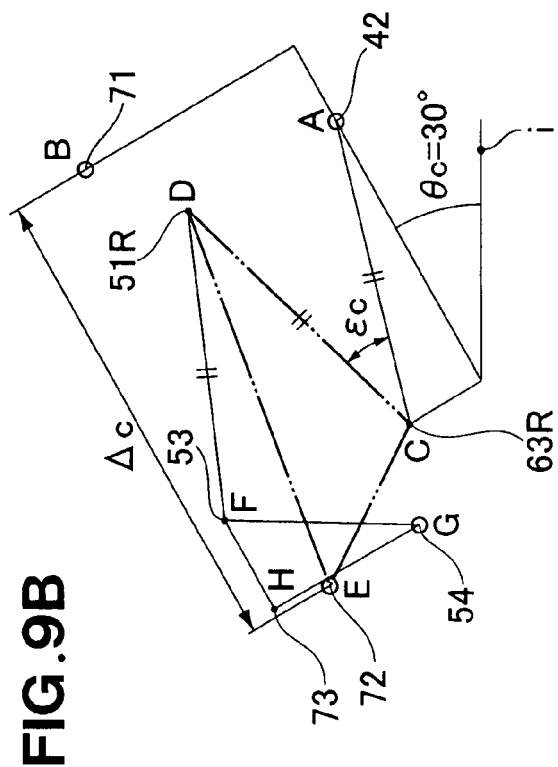

When point D is superposed over point A as shown in FIG. 9D, point H reaches the stopped position.

To achieve the state in FIG. 9C, the operating devices are laid down until the angle εa reaches 0. Also, to achieve the state in FIG. 9D, the operating devices are laid down until the angle εc reaches 0. The operating devices are operated by the same amount because εa=εc.

Specifically, the operating devices are operated by the same amount whether the vehicle is moving forward at a high or low speed, or in reverse at a high or low speed. As a result, driving the vehicle is extremely simple because the vehicle can be turned regardless of speed.

The operating devices are successfully operated by the same amount regardless of speed. This is achieved by superposing point A over point D; i.e., by superposing the position of the second right pin 51R over the axial center of the first pins 42.

Moving forward and stopping were described above, and moving in reverse will now be described.

Figure 10A:
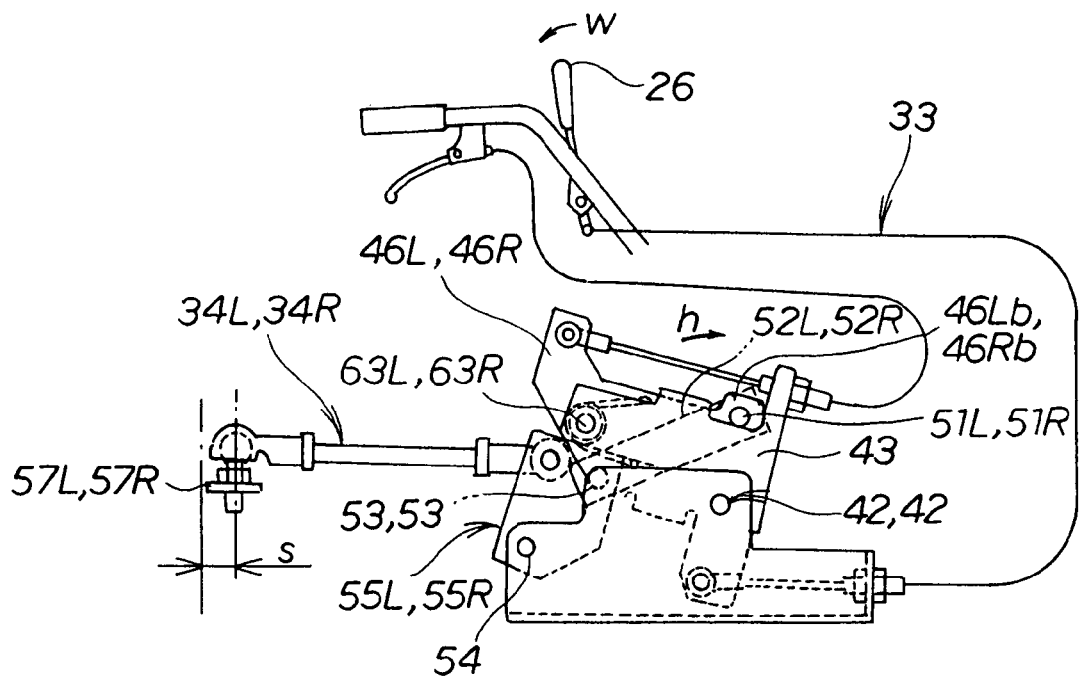
FIG. 10 is a view showing an operation of the gear-shifting mechanism in a case in which the speed setting device is operated for reverse movement, and in a case in which one of the left and right steering devices is operated.

In FIG. 10A, when the speed setting device 26 is operated in the direction of the arrow w and is caused to push the vehicle speed cable 33, the first swinging member 43 swings around the first pins 42, 42, and the left and right second swinging members 46L, 46R swing together with the first swinging member 43.

The link plates 52L, 52R are moved in the direction of the arrow h by the second left pin 51L and the second right pin 51R provided to the other ends 46Lb, 46Rb of the second swinging members 46L, 46R. The drive plates 55L, 55R are driven by the pins 53, 53 provided to the link plates 52L, 52R, and the left and right push-pull rods 34L, 34R are moved by a stroke s from the stopped position x.

Figure 10B:
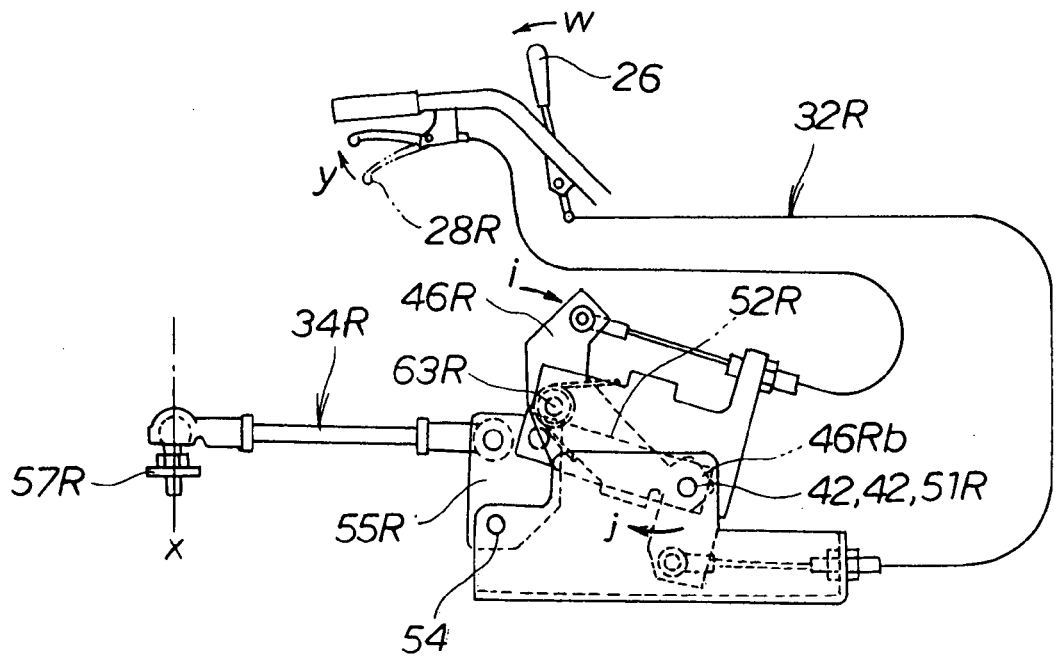
Figure 11:
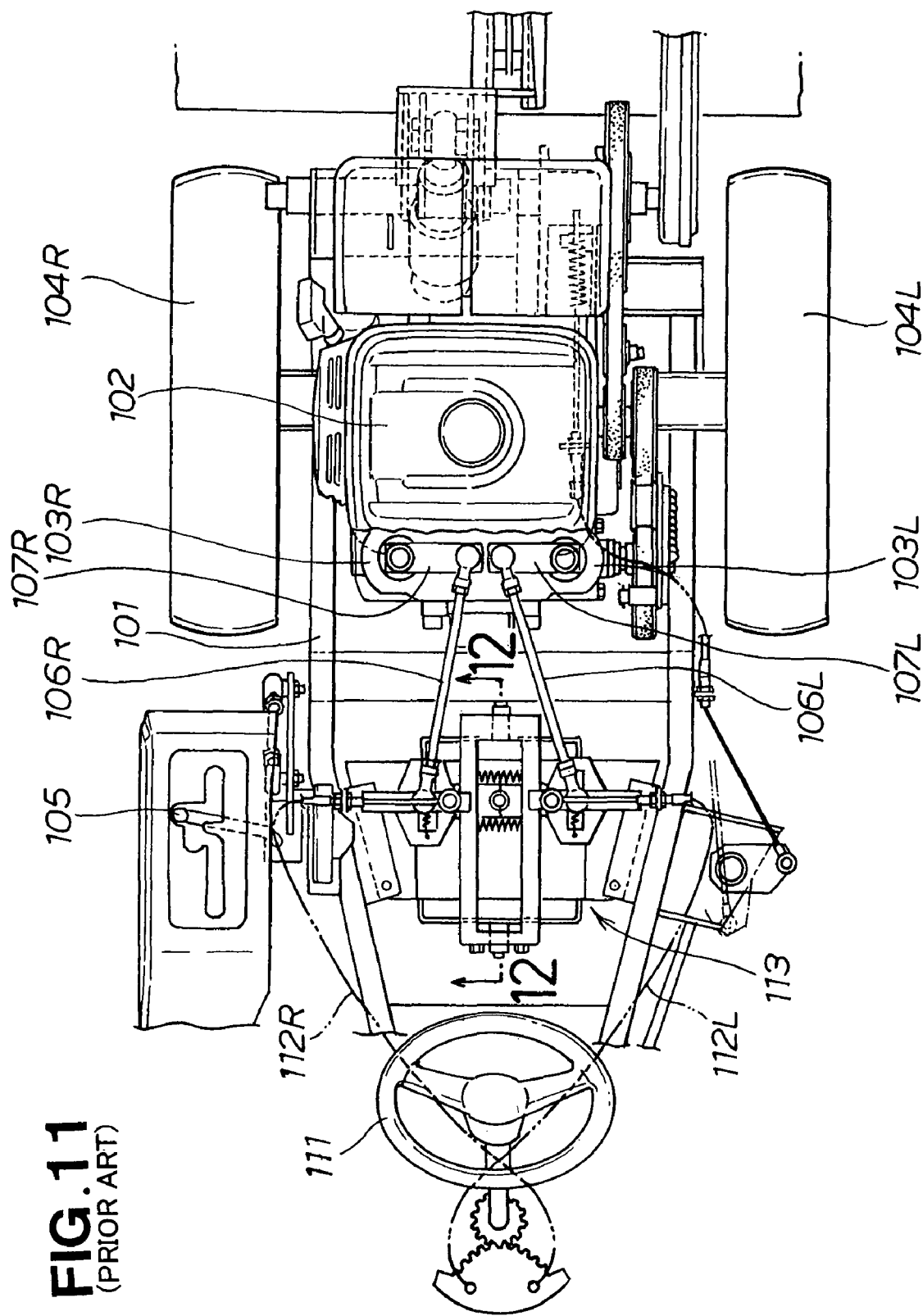
FIG. 11 is a view showing the essential configuration of a conventional hydraulically driven vehicle.
Figure 12:
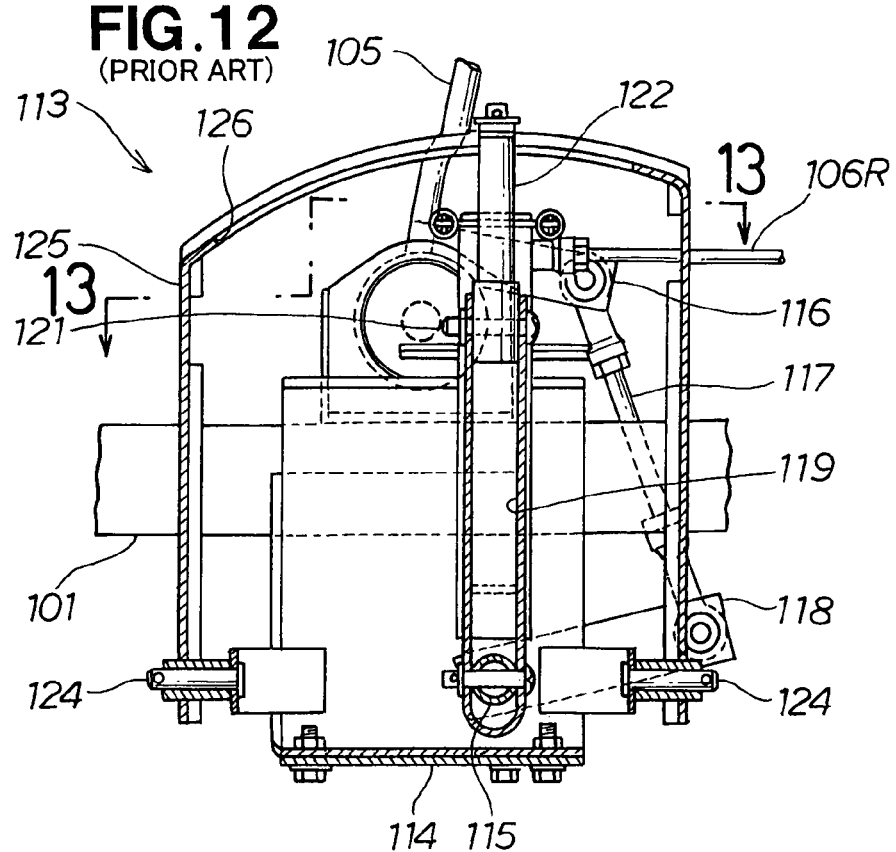
FIG. 12 is a cross-sectional view taken along line 12-12 of FIG. 11.
Figure 13:
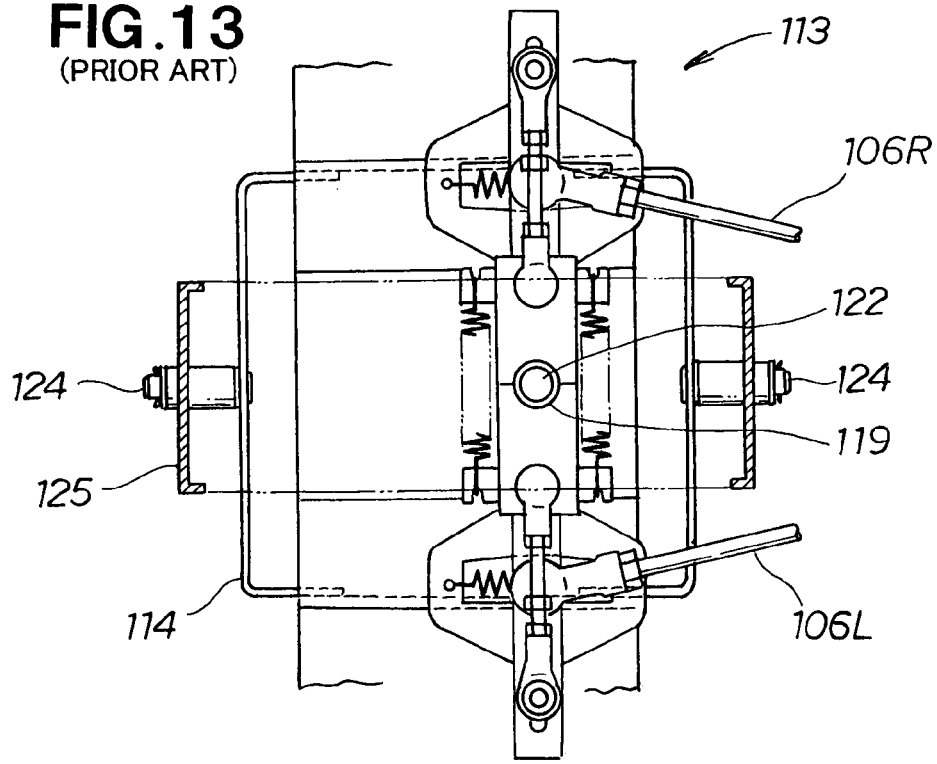
FIG. 13 is a cross-sectional view taken along line 13-13 of FIG. 12.

In FIG. 10B, for example, when the right steering device 28R is operated in the direction of the arrow y and is caused to pull on the right steering cable 32R while the vehicle is moving in reverse as shown in FIG. 10A, the second right swinging member 46R swings around the pin 63R in the direction of the arrow i. The swinging of the second right swinging member 46R moves the link plate 52R in the direction of the arrow j. The right drive plate 55R is driven by the link plate 52R, and the right push-pull rod 34R moves to the stopped position x.

Therefore, the second right pin 51R provided to the other end 46Rb of the second right swinging member is configured so as to move to a position superposed over the first pins, and the gear-shifting arm 57R can therefore be returned to the stopped position x via the drive plate 55R.

The present invention was applied to a hydraulically driven vehicle equipped with crawlers in the present embodiment, but may also be applied to a three- or four-wheel hydraulically driven vehicle.

Obviously, various minor changes and modifications of the present invention are possible in light of the above teaching. It is therefore to be understood that within the scope of the appended claims the invention may be practiced otherwise than as specifically described.

What is claimed is:

1. A hydraulically driven vehicle comprising an engine mounted on a vehicle frame, a left hydrostatic transmission that is driven by the engine and that drives a left drive wheel, a right hydrostatic transmission that is driven by the engine and that drives a right drive wheel, and a gear-shifting mechanism for transmitting to the hydrostatic transmissions the movement of a speed setting device that is operated by an operator to adjust the traveling speed of the vehicle frame, and the movement of left and right steering devices that are operated by the operator to turn the vehicle frame, the gear-shifting mechanism comprising:
- a unitary frame bracket mounted to the vehicle frame;
- a first swinging member that is swingably attached to the frame bracket with left and right first pins and that is moved by the speed setting device;
- a left second swinging member that is swingably attached to the first swinging member at a position away from the left and right first pins and that is moved by the left steering device connected at one end;
- a left resilient member that urges the left second swinging member into the first swinging member so that the left second swinging member swings together with the first swinging member when the left steering device is not operating;
- a right second swinging member that is rotatably attached to the first swinging member at a position away from the left and right first pins and that is moved by the right steering device connected to one end;
- a right resilient member that urges the right second swinging member into the first swinging member so that the right second swinging member swings together with the first swinging member when the right steering device is not operating;
- a left drive plate swingably attached to the frame bracket to control the left hydrostatic transmission;
- a left link plate that connects the left drive plate to the other end of the left second swinging member;
- a right drive plate swingably attached to the frame bracket to control the right hydrostatic transmission; and
- a right link plate that connects the right drive plate to the other end of the right second swinging member,
- wherein the speed setting device is operated to incline the first swinging member and to simultaneously incline the left and right drive plates, whereby a high forward speed, a low forward speed, stopping, a low reverse speed, and a high reverse speed can be arbitrarily set, and the left steering device can be operated to return the left drive plate to the stopped position, and the right steering device can be operated to return the right drive plate to the stopped position when the first swinging member is inclined.

2. The hydraulically driven vehicle of claim 1, wherein the left second swinging member is connected by a left second pin to one end of the first swinging member, the right second swinging member is connected by a right second pin to one end of the first swinging member, and the position of the left second pin is set in the left second swing member while the position of the right second pin is set in the right second swinging member so that an axial center of the left second pin or an axial center of the right second pin is superposed over the axial center of the left or right first pin when the swinging members are operated by the steering devices.

3. The hydraulically driven vehicle of claim 1, wherein the frame bracket is a three dimensional element including a length dimension, a width dimension, and a height dimension, and wherein the first swinging member, the left and right second swinging members, the left and right drive plates, and the left and right link plates are compactly arranged to fit within at least one of the length, width, and height dimensions of the frame bracket.

4. The hydraulically driven vehicle of claim 1, wherein the left and right steering devices comprise distinct levers disposed on respective left and right handles of the vehicle frame and configured to be independently operated by respective left and right hands of the vehicle operator.

5. The hydraulically driven vehicle of claim 1, further comprising left and right push-pull rods directly interconnecting the respective left and right drive plates to the left and right hydrostatic transmissions.

6. The hydraulically driven vehicle of claim 5, wherein the left and right push-pull rods each comprise a unitary elongated shaft with first and second fittings on opposing ends thereof, with the first fitting connected to the drive plate and the second fitting connected to a control arm of the hydrostatic transmission.

7. The hydraulically driven vehicle of claim 1, wherein the first swinging member comprises a substantially C-shaped element having a base portion and parallel left and right arms extending from opposing sides thereof, and wherein the speed setting device is operably connected to the base portion and a swinging axis of the left and right second swinging members is respectively disposed at a distal end portion of the left and right arms.

8. The hydraulically driven vehicle of claim 1, wherein each of the left and right second swinging members comprises an elongated body having a first end operably attached to the respective steering device and a second end operably attached to the respective link plate, such that a swinging axis is disposed between the first end and the second end.

9. The hydraulically driven vehicle of claim 1, wherein the speed setting device comprises a cable with an enclosing sheath anchored to the unitary frame bracket such that the speed setting device is configured to move the first swing member relative to the unitary frame bracket.

\* \* \* \* \*